J. F. PALMER.
AUTOMATIC SACKING AND WEIGHING MACHINE.
APPLICATION FILED AUG. 14, 1911.
1,010,308.
Patented Nov. 28, 1911.
2 SHEETS—SHEET 2.
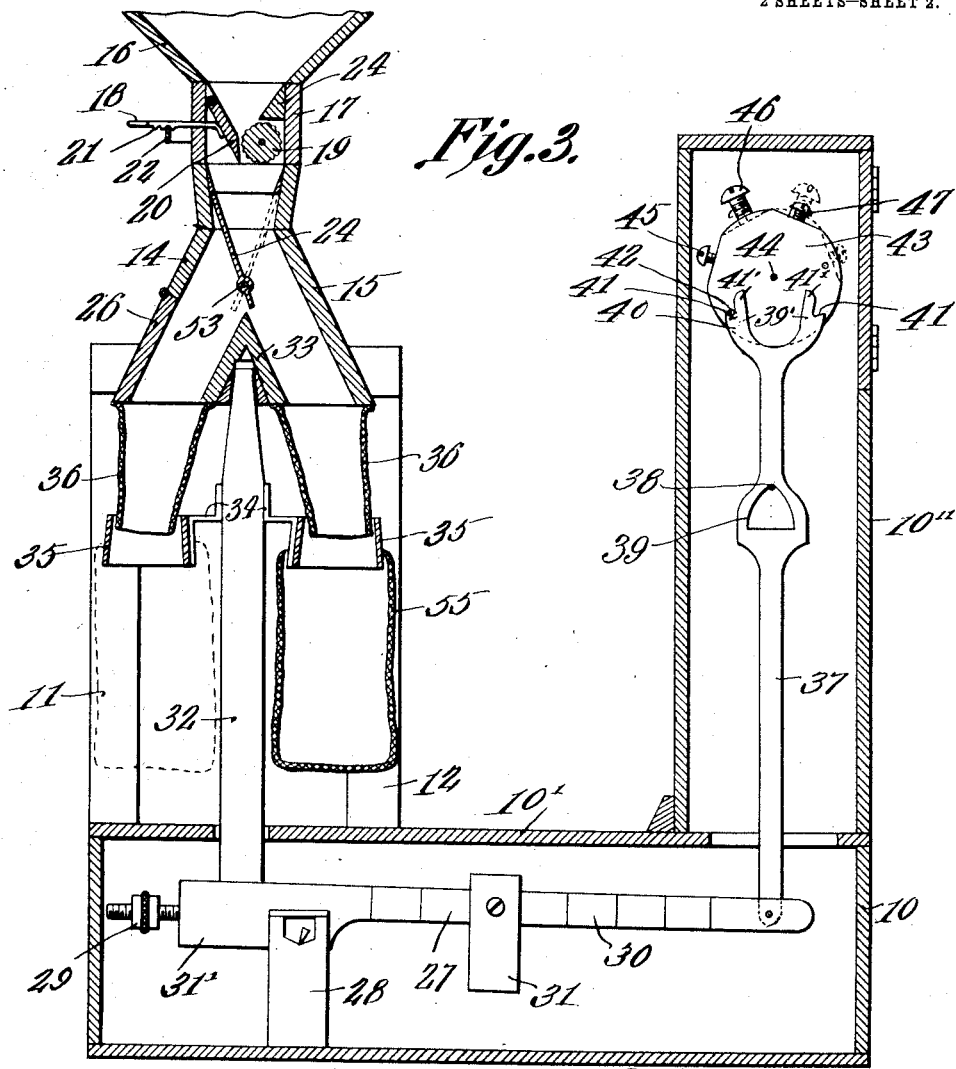
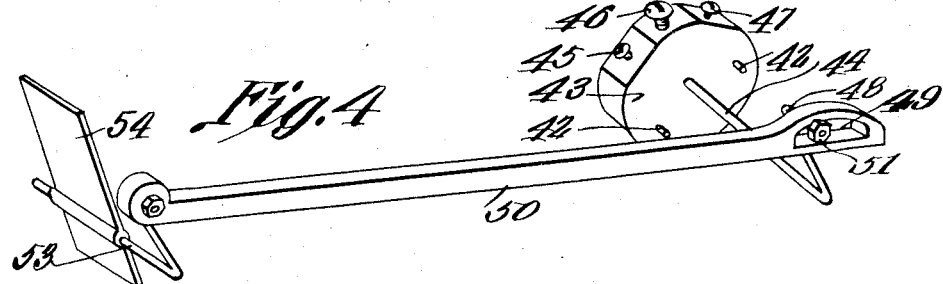
Witnesses
James F. Palmer, Inventor
by C. A. Snow & Co.
Attorneys

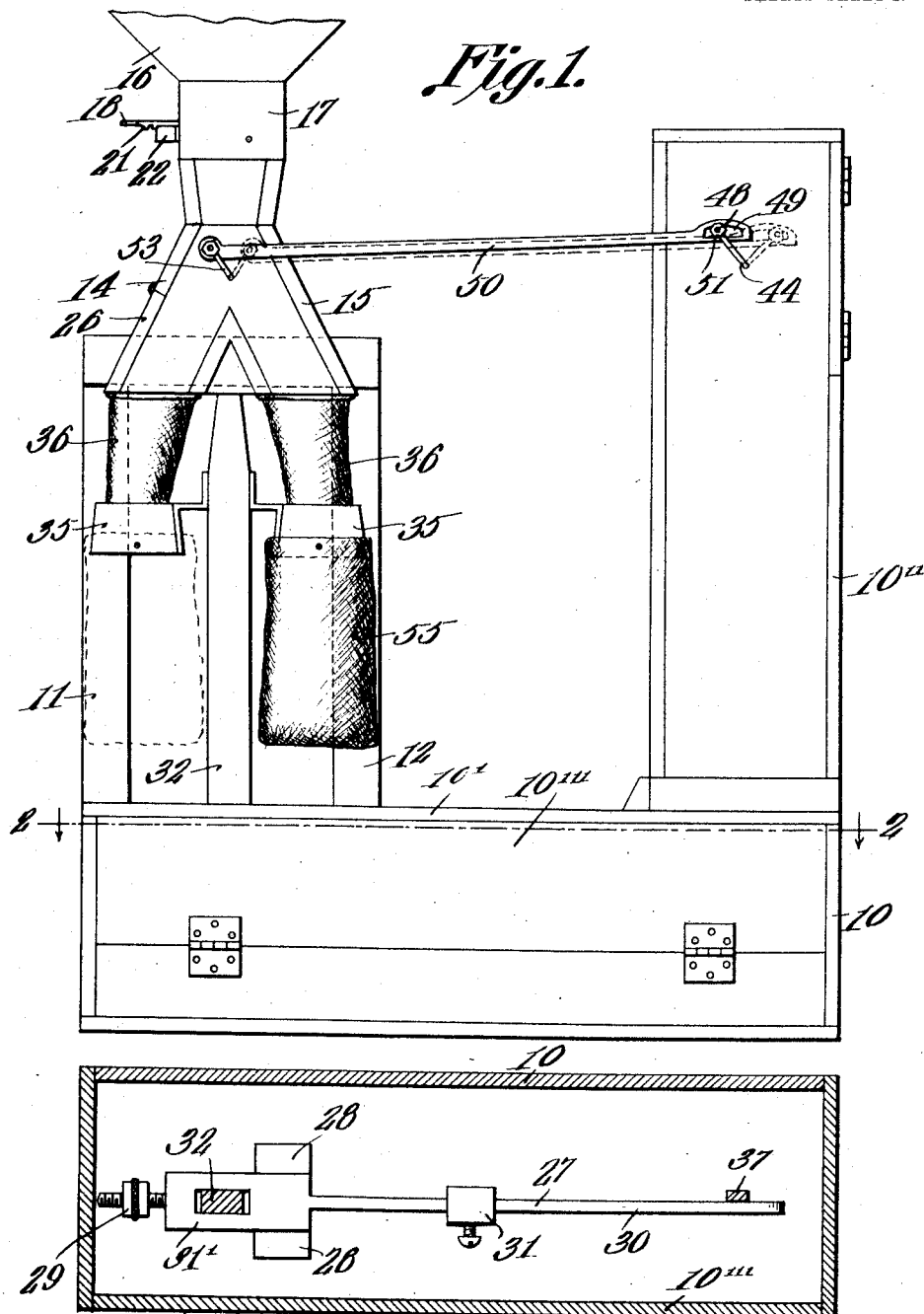

UNITED STATES PATENT OFFICE.

JAMES FRANKLIN PALMER, OF CLAXTON, GEORGIA.

AUTOMATIC SACKING AND WEIGHING MACHINE.

1,010,308. Specification of Letters Patent. Patented Nov. 28, 1911.

Application filed August 14, 1911. Serial No. 643,990.

*To all whom it may concern:*

Be it known that I, JAMES F. PALMER, a citizen of the United States, residing at Claxton, in the county of Tatnall and State of Georgia, have invented a new and useful Automatic Sacking and Weighing Machine, of which the following is a specification.

This invention relates to an improvement in machine for sacking and weighing grain.

The primary object of the present invention is to construct a machine of this character which will fill the sacks or other receptacles with a predetermined quantity of grain in a simple and convenient manner.

In the drawings:—Figure 1 is a side elevation. Fig. 2 is a section on the line 2—2 of Fig. 1. Fig. 3 is a longitudinal section. Fig. 4 is a perspective view of the valve actuating mechanism.

The filling and weighing apparatus is supported by a casing 10. Arranged on said casing 10 are the uprights 11 and 12 supporting diverging chutes 14 and 15. Secured above the said chutes is a hopper 16, in the mouth 17 of which is positioned the feeding mechanism 18. This feeding mechanism consists of the corrugated roller 19, a resiliently supported gate 20 being held in contact with said roller by the notched rod 21, the notches in said rod receiving the U-shaped member 22, to prevent movement of the gate. In order to deflect the material between the corrugated roller 19 and the gate 20, the mouth 17 of the hopper is formed with a deflecting plate 24. The receiving end of the discharge chute is provided with a gate 26 which affords access to the interior of the chute. In the lower boxing 10' of the casing is arranged a scale beam 27, supported by the uprights 28. This beam is of the usual construction and is provided with the regulating mechanism 29 and the scale beam 30 on which the weight 31 is adjustable. Secured to the end portion 31' of the beam is an upright 32 which extends through the casing and whose end portion extends within an opening 33 formed in the chute boxing. At a point adjacent the upper end of said upright 32 are secured a plurality of brackets 34 which support bag holders 35 in a position immediately below the canvas chutes 36 which are secured to the hoppers 15 and 16. Secured to the other end of the scale beam is a vertically extending arm 37 which is guided in its vertical movement by the pin 38 which passes through the yoke 39 formed intermediate the ends of the arm. The arm terminates in the bifurcations 39' and 40 which are provided with notches 41 arranged to contact with the tappets 42 arranged on a disk 43 which is mounted for rotation adjacent the upper end of the portion 10'' of the casing. This disk is mounted on a shaft 44 and positioned on the periphery of the same are the screws 45, 46 and 47. These screws assure an even balance of the disk 43, acting as adjustable weights. The shaft 44 on which the disk 43 is mounted terminates in an offset end 48 which extends beyond the casing and enters a slot 49 in the end portion of an arm 50, a nut 51 being secured on the offset end of the shaft 44 to prevent displacement of the arm 50. The offset end of the shaft is restricted in its movement by projecting pins 42 which prevent a complete rotation of the shaft, the pins being so positioned as to merely allow said shaft to rock. The arm 50 is secured at its other end to a shaft 53 similarly constructed to the shaft 44, this shaft 53 being arranged immediately below the hopper of the diverging chutes. Arranged on said shaft is a gate 54 which alternately closes the diverging chutes, directing the material into either one or the other of said chutes.

The material is fed into the hopper 17, being fed to the delivery chute by the feeding mechanism 18. As shown in Fig. 3 of the drawings the grain will descend through the chute 16 and be deposited within a bag 55 supported by the bag holder 35. As soon as a quantity of grain or other material sufficient to overcome the balance of the weight 31 has been deposited within the bag 55 the upright 32 will descend forcing the scale beam to the position shown in dotted lines. This causes an upward movement of the arm 37 one of the bifurcations of said arm contacting with a tappet 41 to impart a partial rotation to the disk 43, the tappet being directed within the notch of said arm by a finger 41'. The rocking of the disk 43 will impart a partial rotation to the shaft 44. As this shaft is rocked the arm 50 will be moved to the position shown in dotted lines in Fig. 1, the gate 54 being moved to cover the chute 15, and allow the material to descend through the chute 16, allowing the operator to move the bag which has been filled.

It will be noted that the weight 31 may be adjusted on the beam 30 in order to regulate the amount of material supplied to the bag the lower portion of the casing 10' being provided with a door 10''' in order that the operator may have access to the casing. As before stated the disk 43 is provided with screws 45, 46 and 47. The central screw 46 is of sufficient weight to throw the gate 54, the rocking of the shaft, merely serving to incline the disk in one direction or the other. The adjustable screws 45 and 47 being provided to evenly balance the wheel.

The many advantages of a sacking and weighing mechanism of this character will be clearly apparent as it will be noted that the material is fed to the sacks in a simple and convenient manner, all of the parts being readily accessible to the operator and said parts being such as may be readily assembled. It will also be noted that the operator may accurately regulate the amount of material to be fed to each sack in a simple and convenient manner.

What is claimed is:—

1. In a grain sacking and weighing apparatus, a plurality of diverging delivery chutes, a valve arranged to close said chutes, a scale beam, a vertically movable standard secured to said beam, said standard being provided with bag supports, an arm secured to said beam, a shaft mounted adjacent the free end of said arm, a weighted disk arranged on said shaft, and an operative connection between said shaft and said valve.

2. In a grain sacking and weighing apparatus, a plurality of diverging delivery chutes, a valve arranged to close said chutes, a scale beam, a bag support secured adjacent one end of said beam, an arm secured to the other end of said beam, a shaft mounted adjacent the free end of said arm, a disk mounted on said shaft, and an operative connection between said shaft and said valve.

3. In a grain sacking and weighing apparatus, a plurality of delivery chutes, a valve arranged to close said chutes, a scale beam, a bag holder supported by said beam, a weighted disk, an operative connection between said beam and said disk, and an operative connection between said disk and said valve whereby movement imparted to the disk in either direction will uncover one of said chutes.

4. In a grain sacking and weighing apparatus a plurality of diverging delivery chutes, a valve arranged to close said chutes, a scale beam, a bag support arranged on said beam, a weighted disk, means for regulating the movement of said disk, an operative connection between said disk and said valve, and an operative connection between said disk and said beam.

In testimony that I claim the foregoing as my own, I have hereto affixed my signature in the presence of two witnesses.

JAMES FRANKLIN PALMER.

Witnesses:
G. C. EDWARDS,
J. B. BREWTON.

---

Copies of this patent may be obtained for five cents each, by addressing the "Commissioner of Patents, Washington, D. C."